United States Patent [19]
Clair et al.

[11] Patent Number: 5,455,017
[45] Date of Patent: * Oct. 3, 1995

[54] PRODUCTION OF CONCENTRATED AQUEOUS SOLUTIONS OF FERRIC CHLORIDE

[75] Inventors: Rene Clair, Martigues; Alain Gallet, Lavera, both of France

[73] Assignee: Atochem, Puteaux, France

[*] Notice: The portion of the term of this patent subsequent to Jun. 6, 2012 has been disclaimed.

[21] Appl. No.: 32,184

[22] Filed: Mar. 15, 1993

Related U.S. Application Data

[63] Continuation of Ser. No. 672,771, Mar. 20, 1991, abandoned, which is a continuation of Ser. No. 345,246, May 1, 1989, abandoned.

[30] Foreign Application Priority Data

Apr. 29, 1988 [FR] France .................. 88 05800

[51] Int. Cl.⁶ .................................................. C01G 49/10
[52] U.S. Cl. ................................................................ 423/493
[58] Field of Search .................... 423/493; 159/DIG. 16; 203/12

[56] References Cited

U.S. PATENT DOCUMENTS

| | | | |
|---|---|---|---|
| 1,054,400 | 2/1913 | Dow et al. | 423/493 |
| 1,969,793 | 8/1934 | Hechenbleikner | 203/12 |
| 2,096,855 | 10/1937 | Ladd. | |

FOREIGN PATENT DOCUMENTS

| | | | |
|---|---|---|---|
| 9113798 | 3/1973 | Japan | 423/493 |
| 596541 | 4/1976 | U.S.S.R. | 423/493 |
| 181666 | 3/1981 | U.S.S.R. | 423/493 |

OTHER PUBLICATIONS

Translation of JP 49-113798, (1974) No Month Available.

Perry, *Chemical Engineers Handbook*, 3d, p. 510 (1950). No Available Mo.

*Primary Examiner*—Gary P. Straub
*Attorney, Agent, or Firm*—Burns, Doane, Swecker & Mathis

[57] ABSTRACT

35% to 45% by weight concentrated aqueous solutions of ferric chloride, directly useful as flocculating agents in a variety of water treatments, are prepared by (a) reacting chlorine with an aqueous solution of ferrous chloride, in the presence of a recycled aqueous solution of ferric chloride; (b) decompressing the step (a) reaction product solution to vaporize water therefrom, thereby concentrating same; and (c) recycling a fraction of the decompressed liquid phase to step (a) and recovering remaining fraction as final product aqueous solution of ferric chloride.

8 Claims, 1 Drawing Sheet

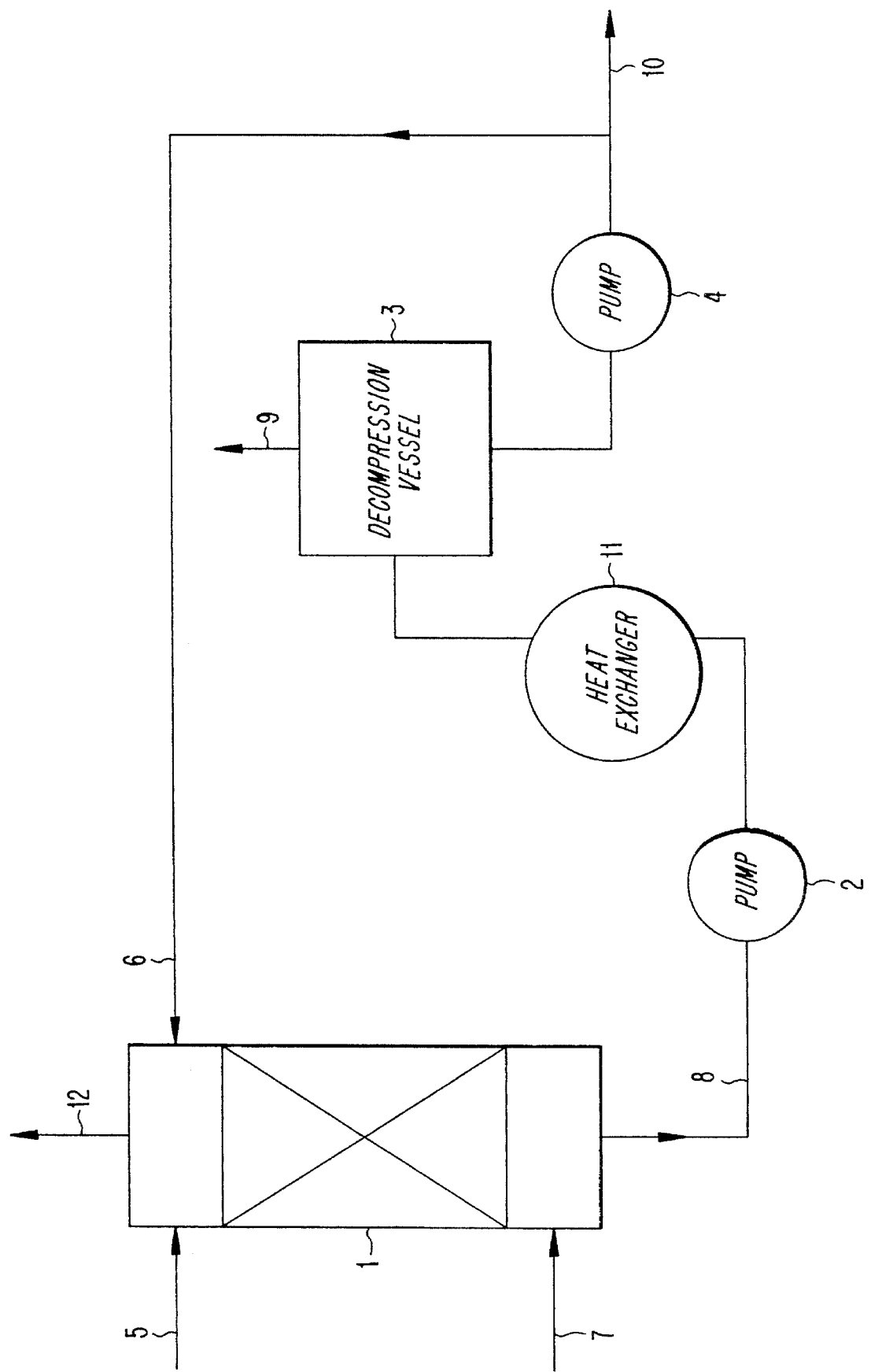

5,455,017

PRODUCTION OF CONCENTRATED AQUEOUS SOLUTIONS OF FERRIC CHLORIDE

CROSS-REFERENCE TO COMPANION APPLICATIONS

This application is a continuation of application Ser. No. 07/672,771, filed Mar. 20, 1991, now abandoned, which is a continuation of application Ser. No. 07/345,246, filed May 1, 1989, now abandoned.

BACKGROUND OF THE INVENTION

1. Field of the Invention

The present invention relates to the preparation of ferric chloride from ferrous chloride, and, more especially, to the preparation of 35% to 45% by weight aqueous solutions of ferric chloride.

2. Description of the Prior Art

The above aqueous solutions of ferric chloride are known to be useful as flocculating agents in water treatment. Compare, for example, Kirk-Othmer, *Encyclopedia of Chemical Technology*, 3rd edition, volume 24, pages 394–396 (1984) and volume 10, page 498 (1980).

The simplest process for the preparation of ferric chloride solutions entails digesting iron with concentrated hydrochloric acid; a solution containing approximately 36% by weight of ferrous chloride ($FeCl_2$) is thus obtained and this is chlorinated to produce a solution of ferric chloride ($FeCl_3$) analyzing, by titration, at about 41% by weight. This 41% solution can be directly employed as a flocculating agent, and is the usual commercial form. A concentrated solution of $FeCl_2$ must be produced because $FeCl_2$ and $FeCl_3$ can undergo partial hydrolysis over the course of concentration by evaporation, to give HCl. The presence of HCl in $FeCl_3$ is a particular problem in water treatment. The above process also requires the use of concentrated hydrochloric acid.

U.S. Pat. No. 4,066,748 describes a process for preparing ferric chloride beginning with a solution of $FeCl_2$ emanating from a descaling bath. This process requires both a concentration of the ferrous chloride as well as a two-step chlorination.

U.S. Pat. No. 3,682,592 describes a process similar to that of the '748 patent, but in which the ferrous chloride solution is contacted with oxygen.

SUMMARY OF THE INVENTION

Accordingly, a major object of the present invention is the provision of an improved process for preparing ferric chloride simply by chlorinating a dilute solution of ferrous chloride.

Briefly, the present invention features the preparation of ferric chloride from ferrous chloride, comprising:

(a) contacting chlorine with an aqueous solution containing ferrous chloride, in the presence of an aqueous solution containing ferric chloride;

(b) decompressing the reaction product produced in step (a); and (c) recycling a fraction of the decompressed liquid phase to step (a), while recovering the remaining fraction as final product aqueous solution of ferric chloride.

BRIEF DESCRIPTION OF THE DRAWING

The FIGURE of Drawing is a schematic/diagrammatic illustration of the process/apparatus according to the present invention.

DETAILED DESCRIPTION OF THE PREFERRED EMBODIMENTS OF THE INVENTION

More particularly according to the present invention, the starting material ferrous chloride is in the form of an aqueous solution, as is the step (a) solution of ferric chloride. By "in the presence of ferric chloride" is intended that the ferric chloride solution is injected into the step (a) reaction mixture, in addition to the ferrous chloride solution, and whereby the ferrous chloride is then chlorinated to ferric chloride. Either liquid or gaseous chlorine, or a gaseous or liquid phase containing chlorine, may be employed. The contacting may be carried out in any manner; it suffices simply to ensure good contact between the chlorine and the ferrous chloride. For example, a stirred reactor, or a reactor including a distillation column or an absorption column may be used. A column equipped with contacting means such as plates or packing rings or with a number of these means may advantageously be employed. The ferrous chloride solution and the ferric chloride solution are charged into the top of the column and the chlorine is countercurrently introduced at the base of this column. A minor amount of chlorine is collected at the top of this column, if a stoichiometric excess thereof (relative to the amount of ferrous chloride) has been employed, together with any gases which may have accompanied the chlorine, as well as a minor amount of water vapor which has been entrained by its vapor pressure. A ferric chloride solution is recovered from the base of the column. It is also within the scope of the present invention to introduce the ferric chloride and ferrous chloride solutions at a number of points along the column. Likewise, the chlorine may be introduced at a number of points along the column.

Step (b) entails decompressing the solution produced in step (a). This decompression effects a partial vaporization of the water present in the ferric chloride solution; a concentration of the ferric chloride solution thus results. Such decompression is carried out in any storage vessel; it suffices that its geometry permits the separation of the vapor phase from the liquid phase.

Step (c) of the process of the invention comprises recycling a fraction of the above liquid phase to step (a) and recovering the remaining fraction as the final product aqueous solution of ferric chloride. The amount of final product solution corresponds, in the number of moles, to the amount of ferrous chloride in the solution introduced in step (a).

This solution is advantageously cooled to ambient temperature.

The ferrous chloride solution which is introduced into step (a) may be of any concentration; it may also contain hydrochloric acid. A ferrous chloride solution which does not contain any hydrochloric acid is advantageously used. This makes it possible to directly use the ferric chloride as a flocculating agent for a variety of water treatments.

Step (a) is advantageously carried out at a moderate temperature, namely, at a temperature such that, together with the residence time in step (a), hydrolysis of the $FeCl_2$ does not occur.

The reaction between the ferrous chloride and chlorine is complete. A ferrous chloride residence time of at least 10 seconds and preferably less than 4 hours is advantageously observed.

It is not necessary to chlorinate all of the $FeCl_2$; ferric chloride specifications sometimes permit from 0.1 to 1% by weight of $FeCl_2$ in the ferric chloride solution. It is also within the scope of this invention to employ a stoichiometric excess of the chlorine.

The temperature of the reaction medium in step (a) advantageously ranges from 50° to 100° C. Any particular pressure may be used in step (a); for convenience, the operation is carried out at a pressure of from atmospheric pressure to 6 bars, and preferably from atmospheric pressure to 1 bar gauge.

The pressure to which the reaction product produced in step (a) is decompressed is proportional to the amount of water which is intended to be evaporated. The greater the decompression, the more water is evaporated off. The amount of water evaporated off also depends on the flow rate of the solution which is decompressed; the larger this amount, the more is evaporated off. The amount of ferric chloride which is recycled advantageously ranges from 1 to 10 times the amount of ferric chloride recovered as final product.

The amount of water to be evaporated off depends on the concentration of the $FeCl_2$ solution and on the desired concentration of the $FeCl_3$ in the final product. The amount of $FeCl_3$ solution which is recycled also makes it possible to control the temperature in the system; the higher the recycle flow rate, for the same amount of $FeCl_2$, the lower the temperature at the outlet of step (a). The heat energy provided by the $FeCl_2$ chlorination reaction is essentially consumed by the decompression, which is reflected in a lowering of the temperature. If it is desired to evaporate more water, energy must be supplied. The reaction product produced in step (a) is advantageously heated prior to the decompression. This heating advantageously does not exceed 110° C., such as to avoid decomposition of the $FeCl_3$. The heating/decompression cycle can also be repeated a number of times. It of course suffices to recompress the liquid phase after the decompression, for example with the aid of a pump. Advantageously, the decompression is effected to an absolute pressure ranging from 0.05 to 0.3 bars. The vacuum is provided, for example, by a pump or a steam ejector.

In another embodiment of the invention, the ferric chloride solution may also be heated after the decompression and before it is recycled to step (a), but naturally after the final product solution has been withdrawn. This makes it possible to provide heat energy at a low level and, hence, to fully utilize such heat energy and also not to increase the temperature of the $FeCl_3$ solution too much.

In a preferred embodiment of the invention, and provided that the temperature levels are compatible, the heat energy may be transferred from the output of ferric chloride solution to the ferrous chloride feedstream solution for step (a). This permits a preheating of same. This also permits some heat energy to be gained and hence more water to be evaporated off during the decompression. Less additional heat energy also need be supplied prior to such decompression.

One advantage of the present invention is that it permits the use of a dilute solution of ferrous chloride to produce a concentrated solution of ferric chloride, while avoiding the use of evaporators.

Apparatus suitable for carrying out the process of the invention is shown in the Figure of Drawing. Step (a) is carried out in the column 1, downstream of which are situated the decompression vessel 3 and the pumps 2 and 4. The ferrous chloride solution is introduced via line 5, the recycled ferric chloride solution via line 6 and the chlorine via line 7. The reaction product is conveyed by means of conduit 8, via the heat exchanger 11, to the decompression vessel 3. This vessel 3 is connected to the vacuum system by the line 9. The liquid phase is removed from the decompression vessel by the pump 4. The final product solution is recovered through the outlet 10. The inerts introduced with the chlorine are collected at outlet 12.

In order to further illustrate the present invention and the advantages thereof, the following specific examples are given, it being understood that same are intended only as illustrative and in nowise limitative.

EXAMPLE 1

An apparatus as shown in the FIGURE of Drawing was used, in which the column i was constructed of glass, and had an inner diameter of 0.35 m and a packing height of 10 m.

A solution of 296 kg/h of $FeCl_2$ and 704 kg/h of water at 80° C. was introduced through inlet 5 and a flowstream of 82.7 kg/h of chlorine and 5 kg/h of inerts via line 7. The 5 kg/h of inerts were collected at outlet 12 and a ferric chloride solution at 85° C. was transferred via line 8. The column 1 was at a pressure of 1.1 bars absolute. The ferric chloride solution was reheated from 85° to 94° C. by means of the heat exchanger 11 and it was then decompressed to a pressure of 0.25 bars absolute in the vessel 3. A solution containing 2,272 kg/h of $FeCl_3$ and 3,269 kg/h of water was recycled via line 6 and 379 kg/h of $FeCl_3$ diluted in 545 kg/h of water were withdrawn through outlet 10.

EXAMPLE 2

The procedure of Example 1 was repeated, but a more dilute solution of $FeCl_2$ was introduced through line 5, i.e., 296 kg/h $FeCl_2$ in 963 kg/h of water. The $FeCl_3$ solution entering conduit 8 was at 76° C.; it was reheated to 106° C. in heat exchanger 11 and was then decompressed to 0.15 bars absolute in vessel 3. The temperature of the liquid phase decreased to 62° C. The same concentrated solution of $FeCl_3$ as in Example 1 was withdrawn from outlet 10.

EXAMPLE 3

The procedure of Example 1 was again repeated, but in a column 0.4 m in diameter and a more dilute solution of $FeCl_2$ was introduced through line 5, i.e., 296 kg/h or $FeCl_2$ in 963 kg/h of water. The $FeCl_3$ solution entering conduit 8 was at 69° C.; it was reheated to 92° C. in exchanger 11 and then decompressed in vessel 3 to 0.15 bars absolute. The same concentrated solution of $FeCl_3$ as in Example 1 was withdrawn from outlet 10, but the recycle flow rate through conduit 6 was 3,790 kg/h of $FeCl_3$ diluted in 5,450 kg/h of water.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an aqueous solution of ferric chloride, comprising (a) reacting chlorine with a dilute aqueous solution of ferrous chloride, in the presence of a recycled aqueous solution of ferric chloride; (b) reducing the pressure over the step (a) reaction product solution to vaporize water therefrom and concentrate same solution to obtain a concentrated liquid phase containing at least 35% by weight ferric chloride without significant hydrolysis and formation of hydrochloric acid; and (c) recycling a fraction of the concentrated liquid phase to step (a) and separating the remaining fraction of concentrated liquid phase as a final product.

2. The process as defined by claim 1, comprising heating the step (a) reaction product solution up to 110° C. prior to the pressure reduction.

3. The process as defined by claim 1, wherein the amount of recycled liquid phase ranges from 1 to 10 times the amount of recovered fraction of final product solution.

4. The process as defined by claim 1, comprising heating said recycled fraction after the decompression of step (b).

5. The process as defined by claim 1, wherein the product solution is a 35% to 45% by weight concentrated aqueous solution of ferric chloride.

6. The process as defined by claim 1, wherein step (a) is carried out in a single reaction zone.

7. The process for the preparation of an aqueous solution of ferric chloride according to claim 1, wherein the temperature of the reaction medium in step (a) ranges from 50° C. to 100° C.

8. The process for the preparation of an aqueous solution of ferric chloride according to claim 1, wherein said reduced pressure is an absolute pressure ranging from 0.5 to 0.3 bars.

* * * * *